US006956812B2

(12) United States Patent
Okada et al.

(10) Patent No.: US 6,956,812 B2
(45) Date of Patent: Oct. 18, 2005

(54) RECEPTION APPARATUS

(75) Inventors: Takahiro Okada, Saitama (JP);
Toshihisa Hyakudai, Chiba (JP); Isao
Matsumiya, Kanagawa (JP); Yasunari
Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 893 days.

(21) Appl. No.: 09/826,758

(22) Filed: Apr. 5, 2001

(65) Prior Publication Data

US 2001/0055271 A1 Dec. 27, 2001

(30) Foreign Application Priority Data

Apr. 7, 2000 (JP) .............................. 2000-111947

(51) Int. Cl.[7] .............................................. H04J 11/00
(52) U.S. Cl. ...................... 370/208; 370/210; 370/343; 375/260
(58) Field of Search ................................ 370/206, 208, 370/210, 281, 343, 480, 350; 375/260, 261, 375/148, 222, 298, 303, 343, 344, 353, 354, 375/355, 200, 202

(56) References Cited

U.S. PATENT DOCUMENTS

| | | | | |
|---|---|---|---|---|
| 6,058,121 A | * | 5/2000 | Kim et al. .................. | 370/480 |
| 6,125,124 A | * | 9/2000 | Junell et al. ................ | 370/503 |
| 6,172,993 B1 | | 1/2001 | Kim et al. | |
| 6,381,263 B1 | * | 4/2002 | Suzuki ....................... | 375/148 |
| 6,459,744 B1 | | 10/2002 | Helard et al. | |
| 6,646,980 B1 | * | 11/2003 | Yamamoto et al. ......... | 370/208 |
| 6,650,617 B1 | * | 11/2003 | Belotserkovsky et al. .. | 370/210 |
| 6,714,511 B1 | * | 3/2004 | Sudo et al. ................ | 370/208 |

FOREIGN PATENT DOCUMENTS

| | | |
|---|---|---|
| EP | 0 944 213 | 9/1999 |
| FR | 2 758 031 | 7/1998 |
| WO | WO 97 26742 | 7/1997 |
| WO | WO 99/17492 * | 4/1999 |

OTHER PUBLICATIONS

Combelles P et al: "A receiver architecture conforming to the OFDM based digital videp broadcasting standard for terrestrial transmission (DVB-T)" Communications, 1998. ICC 98. Conference Record. 1998 IEEE International Conference on Atlanta, GA, USA Jun. 7-11, 1998, New York, NY, USA, IEEE, pp. 780-785, XP010284718 ISBN: 0-7803-4788-9.

* cited by examiner

Primary Examiner—Ajit Patel
Assistant Examiner—Chirag Shah
(74) Attorney, Agent, or Firm—Frommer Lawrence & Haug LLP; William S. Frommer; Thomas F. Presson

(57) ABSTRACT

A reception apparatus for OFDM signals having a short initial rise time since start of reception until outputting the sound and/or a picture. An OFDM reception apparatus 1 of the ISDB-T standard presets the TMCC information at the outset in a memory 19 in association with each broadcasting station. This TMCC information contains the information on the RF frequency and the guard interval length, time interleaving pattern information, the information on the carrier modulation scheme and the information on the code rate of the convolutional code. When a user selects a broadcasting station, a control circuit 18 reads out the TMCC information associated with the broadcasting station from the memory 19. The control circuit 18 affords the read-out TMCC information to each circuit to set e.g., the guard interval or the carrier modulation scheme.

4 Claims, 2 Drawing Sheets

RECEPTION APPARATUS

BACKGROUND OF THE INVENTION

1. Field of the Invention

This invention relates to a reception apparatus for receiving e.g., digital broadcast by an orthogonal frequency division multiplexing (OFDM) system.

2. Description of Related Art

There has recently been proposed a modulation system termed an orthogonal frequency division multiplexing (OFDM) system, which is such a system in which a large number of orthogonal sub-carriers are provided in a transmission band and data are allocated to amplitude and phase of each sub-carrier to effect digital modulation in accordance with the phase shift keying (PSK) or the quadrature amplitude modulation (QAM).

This OFDM system has a feature that the total transmission speed is not changed from that in the conventional modulation system, even though the band per each sub-carrier is narrow and hence the modulation speed is lowered, because the transmission band is divided into a large number of sub-carriers. The system also has a feature that, since a large number of sub-carriers are transmitted in parallel, the symbol rate is lowered. So, with this OFDM system, the multi-pass time length with respect to the symbol time length can be shorter and hence is rendered less vulnerable to multi-path interference. Moreover, the OFDM system has a feature that, since data is allocated to plural sub-carriers, the transmission/reception circuitry can be formed by using inverse fast Fourier transform for modulation and fast Fourier transform (FFT) for demodulation to realize a transmission/reception circuit.

Referring to FIG. 1, transmission signals by the OFDM system is transmitted in terms of a symbol termed an OFDM symbol as a unit. This OFDM symbol is made up of an effective symbol, as an effective symbol during which IFFT takes place in transmission, and a guard interval which is direct copying of the waveform of a latter portion of the effective symbol. This guard interval is provided in a former portion of the OFDM symbol.

Because of the above characteristics, the OFDM system is extensively investigated as to the possibility of application thereof to terrestrial digital broadcast strongly influenced by the multi-pass interference. For the terrestrial digital broadcast, Digital Video Broadcasting-Terrestrial (DVB-T) or Integrated Services Digital Broadcasting-Terrestrial (ISDB-T) has been proposed.

In each broadcast standard, which uses the OFDM system, such as DVB-T or ISDB-T, the length ratio of the guard interval to the effective symbol (guard interval ratio) can in general be selected from plural values depending on the difference in the contents of the information broadcast or on the characteristics of the transmission route.

For example, in the ISDB-T standard, it is recognized to use one of the values of ¼, ⅛, 1/16 and 1/32 as this guard interval ratio.

How this guard interval ratio is set can be changed e.g., from one channel to another, from one program to another or from one airing time to another, and can be optionally set by a broadcast furnishing side.

In each broadcast standard, which uses the OFDM system, carrier modulation processing of quadrature data modulation, data interleaving along the time axis for improving the anti-fading performance, and encoding by the punctured convolutional code, are used. In each broadcast system, one of plural carrier modulation scheme, one of plural time interleaving patterns and one of plural code rates can be selected, depending on the difference in the contents of the information aired or on the characteristics of the transmission route.

In e.g., the ISDB-T standard, one of DQPSK, QPSK, 16 QAM and 64 QAM can be adopted as the carrier modulation scheme. The time interleaving pattern can be selected from those having the delay amounts of 0 symbol, 2 symbols, 4 symbols, 8 symbols and 16 symbols, while the code rate of the convolutional code can be selected from among ½, ⅔, ¾, ⅚ and ⅞.

How the carrier modulation scheme, time interleaving pattern and the code rate of the convolutional code are set may be changed e.g., from one channel to another, from one program to another or from one airing time to another, and can be optionally set on the broadcast furnishing side.

Meanwhile, the OFDM reception apparatus performs synchronization control for determining the range of FFT operations termed a window synchronization control. Since this window synchronization control performs control of removing sample data of the guard interval length from the OFDM symbol, the reception apparatus needs to know the guard interval ratio of the OFDM signal being received. However, the guard interval ratio is optionally set on the broadcast furnishing side such that it cannot be unequivocally determined on the reception side.

Therefore, the conventional practice is to attempt achieving window synchronization, sequentially using the plural values of the guard interval ratio as set by the standard, and to find out a guard interval ratio that can be accurately demodulated as the demodulated signal is observed.

The result is the lengthened initial rising time until outputting of the sound and/or the picture as from the command for starting the reception until outputting of the sound and/or the picture.

In each broadcast standard, which uses the OFDM system, the manner of setting the carrier modulation scheme of the received signal, time interleaving patterns or the code rate of the convolutional code is stated in the transmission control information. For example, these are stated for the ISDB-T standard and for the DVB-T system in the transmission control information termed the transmission and multiplexing configuration control (TMCC) and in the transmission parameter signalling (TPS), respectively.

Consequently, the reception side is unable to perform decoding processing operations, such as time deinterleaving, demapping or viterbi decoding, until such time the transmission control information is demodulated reliably, with the result that the initial time as from a command for reception starting until sound and/or picture outputting is lengthened.

SUMMARY OF THE INVENTION

It is therefore an object of the present invention to provide a reception apparatus for OFDM signals as from the start of reception until outputting the sound and/or the picture is shortened.

In one aspect, the present invention provides a reception apparatus for receiving an orthogonal frequency division multiplexed (OFDM) signal having, as a unit for transmission, a transmission symbol including an effective symbol generated on dividing the information into respective frequency components in a predetermined range and a guard interval generated on copying the signal waveform of a portion of the effective symbol, in which the apparatus includes Fourier transform means for extracting a processing range corresponding to a period of the effective symbol from the transmission symbol and Fourier transforming the extracted processing range to demodulate the information, window control means for controlling the processing range, input means for a user to input the selective inputting information for selecting the OFDM signal to be received, storage means for storing the information on the length of the guard interval in association with the selective inputting information input by a user, and control means for reading out the information on the guard interval length responsive to the selective inputting information as input for affording the guard interval length information thus read out to the window control means. The window control means controls the processing range, at the time of starting the reception based on the guard interval length information supplied from the control means.

In this reception apparatus, the information on the guard interval length is stored in association with the selective inputting information as input by a user. In starting the reception, the guard interval length information is read out responsive to the selective inputting information from the user to control the range for processing for Fourier transform.

In another aspect, the present invention provides a reception apparatus for receiving an orthogonal frequency division multiplexed (OFDM) signal comprised of the transmission control information quadrature modulated on a subcarrier, in which the apparatus includes Fourier transform means for Fourier-transforming the received OFDM signal to demodulate the information, transmission control information decoding means for decoding the transmission control information from the Fourier transformed signal, input means for inputting from a user the selective inputting information for selecting the OFDM signal to be received, storage means for storing the transmission control information in association with the selective inputting information input by the user, and control means for reading out the transmission control information responsive to the selective inputting information as input to set a demodulating scheme and/or a decoding scheme for the received OFDM signal based on the read-out transmission control information.

In this reception apparatus, the transmission control information is stored in association with the selective inputting information as input by a user. In starting the reception, the transmission control information is read out responsive to the selective inputting information from the user to set the demodulating and/or decoding scheme for the OFDM signals received.

Thus, according to the present invention, the initial rise time as from the start of reception until outputting the sound and/or the picture may be shorter than in the conventional reception apparatus.

DESCRIPTION OF THE PREFERRED EMBODIMENTS

Figure 1:
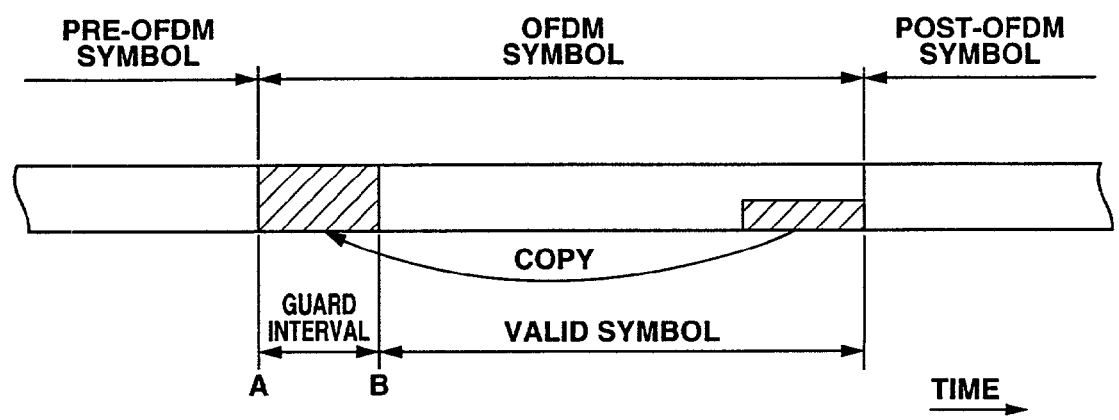
FIG. 1 illustrates OFDM symbols.

Referring to the drawings, a reception apparatus for receiving signals aired in accordance with the ISDB-T standard, according to the present invention, is explained. It is noted that signals aired are of the mode 1 of the ISDB-T mode and of a single segment.

Figure 2:
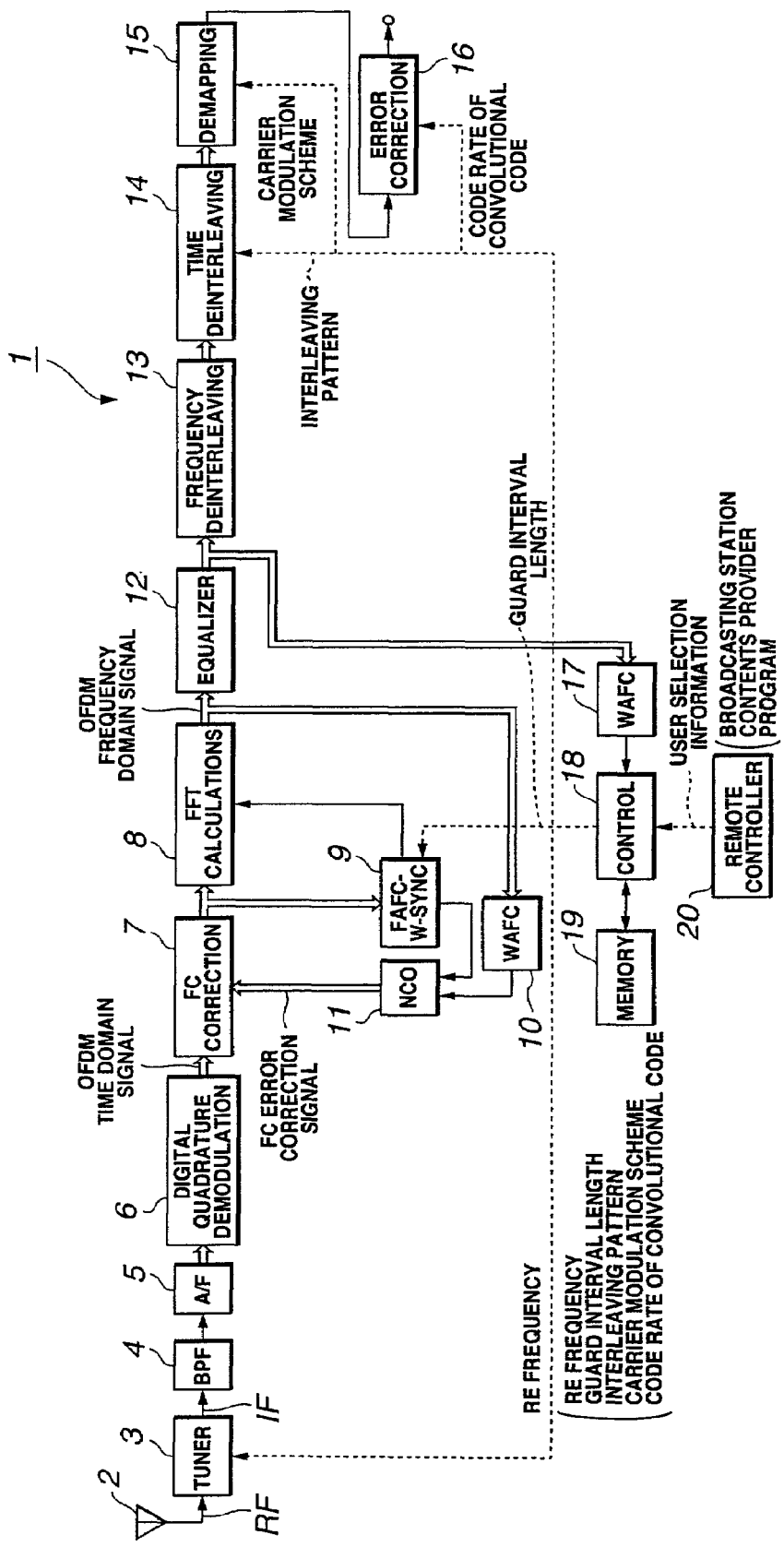
FIG. 2 is a block diagram showing a OFDM apparatus according to the present invention.

FIG. 2 is a block diagram of the OFDM reception apparatus embodying the present invention. In this figure, if the signal transmitted between different blocks is a complex signal or a real signal, respective signal components are denoted by thick and thin lines, respectively.

Referring to FIG. 2, an OFDM reception apparatus 1 includes an antenna 2, a tuner 3, a band-pass filter (BPF) 4, an A/D converter 5, a digital quadrature demodulation circuit 6, an fc correction circuit 7, an FFT calculation circuit 8, a fine fc error calculation window sink (FAFC·W-Sync) circuit 9, a wide fc error calculation (WAFC) circuit 10, a numerical control oscillation circuit (NCO) 11, an equalizer 12, a frequency deinterleaving circuit 13, a time deinterleaving circuit 14, a demapping circuit 15, an error correction circuit 16, a TMCC decoding circuit 17, a control circuit 18 and a memory 19.

The broadcast wave of the digital television broadcast, aired from a broadcasting station, is received by the antenna 2 of the OFDM reception apparatus 1, so as to be supplied to a tuner 3 as RF signals.

The RF signals, received by the antenna 2, are frequency-converted by the tuner 3, made up of a local oscillator and a multiplier, into IF signals, which are supplied to the BPF 4. The local oscillation frequency of the tuner 3 is set by the control circuit 18. The local oscillation frequency associated with the channel selected by a user is set by the control circuit 18. The IF signal, output from the tuner 3, is filtered by the BPF 4 and is digitized by A/D converter 5 so as to be supplied to the digital quadrature demodulation circuit 6.

The digital quadrature demodulation circuit 6 quadrature demodulates the digitized IF signals, using carrier signals of a pre-set frequency (fc: carrier frequency) to output baseband OFDM signals. The baseband OFDM signals, output from this digital quadrature demodulation circuit 6, are so-called time-domain signals prior to being subjected to FFT calculations. So, the baseband signals, prior to being subjected to the FFT calculations and subsequent to being subjected to the digital quadrature demodulation, are termed OFDM time-domain signals. As the result of the quadrature demodulation, the OFDM time domain signals become complex signals having an in phase component (I-channel signals) and an quadrature component (Q-channel signal). The OFDM time-domain signals, output from the digital quadrature demodulation circuit 6, are supplied to the fc correction circuit 7.

The fc correction circuit 7 complex-multiplies the fc error correction signal, output from the NCO 11, with the OFDM time-domain signal, to correct the carrier frequency error of the OFDM time-domain signal. The carrier frequency error is an error of the center frequency location of the OFDM time domain signal generated by e.g. the deviation of the reference frequency output by the local oscillator. The larger this error, the larger becomes the error rate of output data. The OFDM time-domain signal, corrected for the carrier frequency error by the fc correction circuit 7, is sent to the FFT calculation circuit 8 and to the FAFC·W-Sync circuit 9.

The FFT calculation circuit 8 executes FFT operations on the OFDM time-domain signals to extract and output quadrature-modulated data on each sub-carrier. The signal output from the FFT calculation circuit 8 is the so-called frequency domain signal resulting from the FFT. So, the signal following the FFT processing operations is termed OFDM frequency domain signals.

The FFT calculation circuit 8 extracts signals of the range of the effective symbol length, such as 256 samples, from a single OFDM symbol, that is eliminates the guard interval length portion from a sole OFDM symbol, to execute the FFT processing operations on the so-extracted OFDM time-domain signals. Specifically, the processing start position is an optional position from the OFDM symbol boundary to the guard interval end position. This processing range is termed an FFT window.

Similarly to the OFDM time domain signal, the OFDM frequency domain signal, output from the FFT calculation circuit 8, is a complex signal, made up of an in-phase component (I-channel signal) and an quadrature component (Q-channel signal). The OFDM frequency domain signal is sent to the WAFC circuit 10 and to the equalizer 12.

The FAFC·W-Sync circuit 9 and the WAFC circuit 10 calculate the carrier frequency error contained in the output signal of the fc correction circuit 7. The FAFC·W-Sync circuit 9 calculates the fine fc error of a precision not larger than ±½ of the sub-carrier frequency interval. The WAFC circuit 10 calculates the wide fc error of the precision of the sub-carrier frequency interval. The carrier frequency error as found by the FAFC·W-Sync circuit 9 and the WAFC circuit 10 are routed to the NCO 11.

The FAFC·W-Sync circuit 9 finds the timing of starting the FFT processing by the FFT calculation circuit 8 to control the FFT processing range (FFT window). This FFT window is controlled based on the information on the boundary position of the OFDM symbol obtained in calculating the fine carrier frequency error with a precision not higher than ±½ of the sub-carrier frequency interval and on the length of the guard interval of the OFDM signal. The ISDB-T standard provides for four patterns of the guard interval length. The guard interval lengths, expressed in terms of the length ratio to the effective symbol, are ¼, ⅛, ⅟₁₆ and ⅟₃₂. The length of the guard interval of the OFDM signal received is set by the control circuit 18.

The NCO 11 sums the fine carrier frequency error of ±½ precision of the sub-carrier frequency, calculated by the FAFC·W-Sync circuit 9, and the wide fc error of the sub-carrier frequency interval, calculated by the WAFC circuit 10, to output an fc error correction signal, resulting from the summation, and which is increased in frequency depending on the carrier frequency error. This fc error correction signal is a complex number signal supplied to the fc correction circuit 7. The fc error correction signal is complex-multiplied with the OFDM time-domain signal by the fc correction circuit 7 to remove the carrier frequency error component in the OFDM time domain signal.

The equalizer 12 equalizes the phase and the amplitude of the OFDM frequency-domain signal, using e.g., scattered pilot signals (SP signals). The OFDM frequency-domain signals, equalized in phase and in amplitude, are sent to the frequency deinterleaving circuit 13 and to the TMCC decoding circuit 17.

The frequency deinterleaving circuit 13 deinterleaves the data, interleaved in the frequency domain on the transmitting side, in accordance with the interleaving pattern thereof. The data deinterleaved in the frequency domain is routed to the time deinterleaving circuit 14.

The time deinterleaving circuit 14 deinterleaves the data, interleaved on the transmitting side in the time domain, in accordance with the interleaving pattern thereof. The ISDB-T standard provides for five interleaving patterns for each mode. For example, if the mode is the mode 1, the five patterns for which the numbers of the delay adjustment symbols are 0, 28, 56, 112 and 224 are prescribed. The interleaving patterns used for deinterleaving are set under control by the control circuit 18. The data deinterleaved on the time domain are sent to the demapping circuit 15.

The demapping circuit 15 performs demapping in accordance with a pre-set carrier modulation scheme to demodulate data quadrature modulated on each sub-carrier of the OFDM frequency domain signal. In the demapping circuit 15, mapping patterns etc., required for demapping, are set under control by the control circuit 18. The data demodulated by the demapping circuit 15 are sent to the error correction circuit 16.

The error correction circuit 16 viterbi-decodes data encoded on the transmitting side in accordance with the punctured convolutional coding and also performs error correction processing using the Reed Solomon code appended as an outer code. The ISDB-T standard provides the code rate ½, ⅔, ¾, ⅚ and ⅞ for the punctured convolutional code. In the error correction circuit 16, the code rate of the convolutional code for viterbi decoding is set by the control circuit 18.

The data corrected for errors by the error correction circuit 16 are sent to e.g., a downstream side MPEG decoding circuit.

The TMCC decoding circuit 17 extracts TMCC signals, inserted in predetermined sub-carrier positions in a symbol, to decode the information stated in this TMCC. In this TMCC, there is described such information as the system descriptor for the television broadcast system, the countdown index for switching the TMCC information, switch-on control flag used for alert broadcasting, transmission segment identification flag, carrier modulation scheme, code rate of convolutional coding and the time interleaving pattern. The TMCC decoding circuit 17 routes the decoded information to the control circuit 18.

The control circuit 18 controls the respective circuits and the entire device. Moreover, the control circuit 18 is fed with the respective information decoded by the TMCC decoding circuit 17 to control the respective circuits or to set parameters based on this information. Moreover, the control circuit 18 reads out the information stored in the memory 19 to control the respective circuits or to set parameters based on the read-out information.

In the memory 19, there are pre-set, for each broadcasting station, airing the contents (frequency channel), the RF frequency of the broadcasting wave from the station, guard interval length of the OFDM signal aired by the broadcasting station and the contents of the information stated in the TMCC such as the time interleaving pattern, carrier modulation scheme and the code rate convolutional coding.

On a remote controller 20, a broadcasting station (frequency channel) furnishing a program to be viewed is selected by the user, with the information so selected being transmitted by e.g., IR communication to the control circuit 18. It is also possible for a user to refer to e.g., a program guide stated on a paper sheet to select a broadcasting station, or to select the electric program guide (EPG) displayed on e.g. a monitor to select a broadcasting station.

The operation of the above-described OFDM reception apparatus 1 in signal reception is now explained.

The user first uses the remote controller 20 to select the broadcasting station airing the program he or she desires to view and/or listen. The information specifying the broadcasting station selected is routed as the user selection information to the control circuit 18.

The control circuit 18 reads out the RF information, guard interval length, carrier modulation scheme and the code rate of convolutional coding, associated with the broadcasting station as selected by the user from the memory 19. When the receiving operation is started, the control circuit 18 sets the local oscillation frequency for the tuner 3, guard interval length for the FAFC-W-Sync circuit 9, interleaving pattern for the time deinterleaving circuit 14, the code rate of convolutional coding for the error correction circuit 16, and so forth, based on the information as read out.

After the setting operations, the control circuit 18 starts receiving the broadcast.

Thus, the OFDM reception apparatus 1 pre-sets the broadcasting station furnishing contents, the RF frequency of the broadcasting station, the guard interval of the OFDM signal being aired from the station, contents of the TMCC, such as interleaving pattern, carrier modulation scheme and the code rate of convolutional coding, appended to the broadcasting station, in the memory 19 associating with these information each other. When the user selects the broadcasting station he or she desires to receive, the various setting operations are performed based on the information as pre-set in the memory 19.

The information in the memory 19 is pre-set when the apparatus is shipped from the plant. Moreover, the information on the guard interval length or the TMCC information, as detected during the reception of the broadcast, may be pre-set. If the information pre-set in the memory 19 differs from the information stated in the TMCC, the information in the memory 19 is updated to the new information.

If the guard interval length information stored in the memory 19 differs from that of the OFDM signal actually received, such that correct demodulation cannot be achieved, for example, the TMCC cannot be detected, the guard interval length can again be searched to make the setting again.

In the OFDM reception apparatus 1 of the present embodiment, as described above, the initial rise time as from the start of reception until the outputting of the sound and/or the picture can be made shorter without requiring a search operation of sequentially attempting to achieve the window synchronization for the plural guard interval lengths.

Also, the OFDM reception apparatus 1, the initial rise time as from the start of the reception until the outputting of the sound and/or the picture can be shortened by setting the time interleaving pattern, the carrier modulation scheme or the code rate of convolutional code, etc. before the detection of the TMCC information.

In the above explanation, the information pre-set in the memory 19 is stored in each broadcasting station. However, the guard interval length or the TMCC contents may vary from one program to another or from one program genre to another, even for the same broadcasting station. Moreover, a sole frequency band is not necessarily used in one broadcasting station, such that a sole channel may be used by plural broadcasting stations or plural channels may be used by a sole broadcasting station. In addition, the information of plural contents providers may be aired in a multiplexed fashion. So, the information pre-set in the memory 19 may be pre-set in association with the various information which is input in order for the user to view the program, such as the channel, contents provider or the program, instead of the information being stored in association with the broadcasting station.

In the foregoing explanation, the OFDM reception apparatus of the ISDB-T standard is taken as an example. The present invention may, however, be applied to a reception apparatus of the DVB-T or other standards. If, for example, the present invention is applied to the reception apparatus of the DVB-T standard, the transmission control information termed the TPS may be used.

What is claimed is:

1. A reception apparatus for receiving an orthogonal frequency division multiplexed (OFDM) signal having, as a unit for transmission, a transmission symbol including an effective symbol generated on dividing the information into respective frequency components in a predetermined range and a guard interval generated on copying the signal waveform of a portion of said effective symbol, comprising:

means for setting one or more of a time interleaving pattern, carrier modulation scheme and a convolutional code;

Fourier transform means for extracting a processing range corresponding to a period of said effective symbol from said transmission symbol and Fourier transforming the extracted processing range to demodulate the information;

window control means for controlling the said processing range;

input means for a user to input the selective inputting information for selecting the OFDM signal to be received;

means for detecting transmission control information;

storage means for storing information on the length of said guard interval in association with said selective inputting information input by a user; and control means for reading out said information on the guard interval length responsive to the selective inputting information as input and for providing the guard interval length information thus read out to said window control means and for providing the transmission control information to the window control means;

wherein said window control means controlling the processing range, at the time of starting the reception, based on the guard interval length information and the transmission control information provided by said control means, thereby minimizing an initial rise time from a start of reception until output.

2. The reception apparatus according to claim 1, wherein said control means detects the guard interval length of the OFDM signal being received to store the guard interval length as detected in association with the selective inputting information for specifying the OFDM signal being received.

3. The reception apparatus according to claim 1, wherein the transmission control information is quadrature modulated in a sub-carrier of said OFDM signal, the apparatus further comprising:

a transmission control information decoding means for decoding the transmission control information from said Fourier-transformed information;

said storage means stores the decoded transmission control information in association with the selective inputting information, said control means reading out the transmission control information from said storage means responsive to said selective inputting information from the user to set a demodulating scheme and/or a decoding scheme for the OFDM signal received based on the read-out transmission control information.

4. A reception apparatus for receiving an orthogonal frequency division multiplexed (OFDM) signal comprised of the transmission control information quadrature modulated on a sub-carrier, comprising:

Fourier transform means for Fourier-transforming the received OFDM signal to demodulate the information;

transmission control information decoding means for decoding the transmission control information from the Fourier transformed signal;

input means for inputting from a user the selective inputting information for selecting the OFDM signal to be received;

storage means for storing said transmission control information in association with said selective inputting information input by the user; and control means for reading out said transmission control information responsive to said selective inputting information as input to set a demodulating scheme and/or a decoding scheme for the received OFDM signal based on the read-out transmission control information.

wherein said control means detects the transmission control information of OFDM signal being received and stores detected transmission control information in said storage means in association with the selective inputting information specifying the OFDM signal being received, thereby minimizing an initial rise time from a start of reception until output.

* * * * *